UNITED STATES PATENT OFFICE.

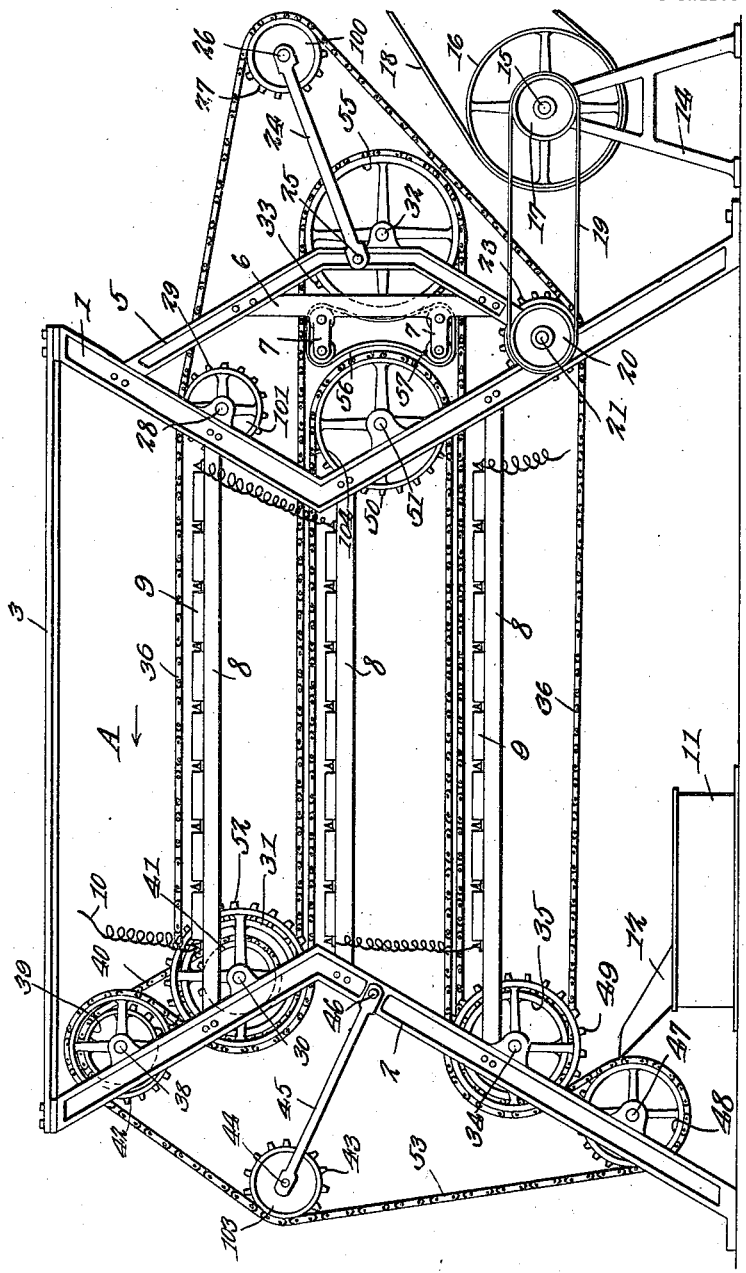

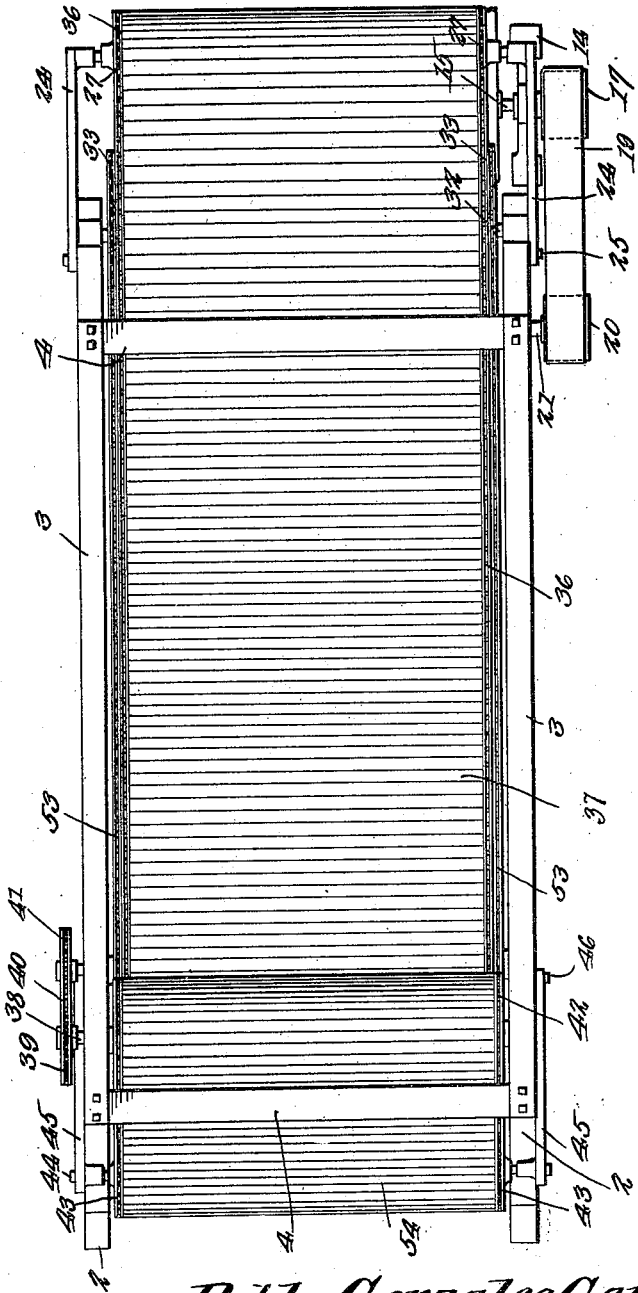

PABLO GONZALES GARZA, OF MONTEREY, MEXICO.

TORTILLA-MACHINE.

1,263,317.

Specification of Letters Patent.  Patented Apr. 16, 1918.

Application filed December 5, 1917. Serial No. 205,582.

*To all whom it may concern:*

Be it known that I, PABLO GONZALES GARZA, a citizen of the Republic of Mexico, residing at Monterey, in the Republic of Mexico, have invented a new and useful Tortilla-Machine, of which the following is a specification.

The device forming the subject matter of this application is adapted to be employed for cooking tortillas, and by way of explanation it may be stated that a tortilla is a piece of corn dough flattened out into approximately circular outline and thin, cakes of this kind being eaten commonly in Mexico and other Latin countries. The corn is cooked in water, with the addition of a little lime, the mixture being ground into a meal which is fashioned into dough. Out of this dough, the tortillas are made in a pressing device, the tortillas being then placed in a machine, to be cooked on one side, turned over, and cooked on the other side, the object in view being to retain the moisture or vapor in the tortilla, between the baked and relatively hard outer walls of the article.

The device forming the subject matter of this application aims to provide novel means for baking or cooking the tortillas on both sides, and to provide novel means for turning the tortillas as the same pass from one run to a belt conveyer to a lower run thereof. It is within the province of the disclosure to improve generally and to enhance the utility of devices of that type to which the present invention appertains.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings:—

Figure 1 shows in side elevation, a tortilla cooking machine constructed in accordance with the present invention; and Fig. 2 is a top plan of the structure delineated in Fig. 1.

In carrying out the present invention, there is provided a support or frame which may be variously constructed. The support or frame is shown as comprising pairs of angular end bars 1 and 2, the angles of the bars 1 and 2 projecting inwardly toward the center of the frame or support. The bars 1 are connected with the bars 2 by means of top strips 3, cross members 4 being employed for uniting the upper ends of the bars 1 and 2. Angle brackets 5 are secured at their upper and lower ends to the bars 1 and project outwardly therefrom, as clearly shown in Fig. 1. The ends of vertical braces 6 are connected to the brackets 5, the braces extending across the angles of the brackets. The braces 6 are provided with inwardly extended arms 7. Intermediate their upper and lower ends, the bars 1 are connected with the bars 2 by means of longitudinal bars 8, supporting heaters 9 of any desired construction, the numeral 10 indicating that electrical heaters may be used, although this detail is not insisted upon. Disposed adjacent that end of the machine which is formed by the bars 2 is a receptacle 11 including an intake chute 12. A bearing frame 14 is located near to that end of the main frame or support which is formed by the bars 1.

A shaft 15 is journaled in the bearing frame 14 and carries a large pulley 16 and a small pulley 17. A belt 18 is trained around the large pulley 16, so that, as will be evident when the structure is better understood, all of the movable parts may be driven from a source of power (not shown). A belt 19 is engaged around the small pulley 17 on the shaft 15, and coacts with a pulley 20 carried by a shaft 21 journaled on the bars 1 adjacent the lower ends of the brackets 5. The shaft 21 carries sprocket wheels 23. Vertically swinging arms 24 are pivoted at 25 to the angle brackets 5, a shaft 26 being journaled in the outer ends of the arms, the shaft carrying a roller 100, provided at its ends with sprocket wheels 27. A shaft 28 is journaled on the bars 1 near to the upper ends of the brackets 5 and carries a drum 101 provided with sprocket wheels 29. A shaft 30 is journaled on the end bars 2 and carries sprocket wheels 31. A shaft 32 is journaled on the brackets 5 near to the drum 100 and carries a drum 55 provided with sprocket wheels 33. A shaft 34 is journaled on the bars 2 near to the lower ends thereof and carries sprocket wheels 35. Sprocket chains 36 are provided, and are connected by slats 37, to form an endless belt conveyer, the sprocket chains 36, passing over the sprocket wheels 23, 27, 29, 31, 33, 35, and thence back to the sprocket wheels 23. The arms 24, together with the roller 100 and the sprocket wheels 27, form a tightener for the belt conveyer 36—37.

For convenience in claiming the invention, that part of the conveyer 36—37 which extends from the sprocket wheels 29 to the sprocket wheels 31 may be called a top run, the part of the conveyer which extends from the sprocket wheels 31 to the sprocket wheels 33 being designated an upper intermediate run, the part of the conveyer extending from the sprocket wheels 33 to the sprocket wheels 35 being designated as a lower intermediate run, and the part of the conveyer which extends from the sprocket wheels 35 across the sprocket wheels 23 and 27 being called a lower run. That part of the conveyer 36—37 which extends around the sprocket wheels 31 is the first bend of the conveyer, and that part of the conveyer which extends around the sprocket wheels 35 is the second bend of the conveyer.

A shaft 38 is journaled on the bars 2 near to the upper ends thereof and carries a sprocket wheel 39 around which is trained a chain 40 engaged with a sprocket wheel 41 on the shaft 30, so that the shaft 38 may be driven from the shaft 30. The shaft 38 carries sprocket wheels 42. Sprocket wheels 43 are carried by a drum 103 mounted on a shaft 44 journaled in arms 45 pivoted at 46 to the bars 2. A shaft 47 is mounted to rotate on the bars 2 near to the lower ends thereof and carries sprocket wheels 48. There are sprocket wheels 49 on the shaft 34. The numeral 50 marks sprocket wheels carried by a drum 104 supported by a shaft 51 journaled on the bars 1 and disposed approximately in a common horizontal plane with the shaft 32. The shaft 30 is provided with sprocket wheels 52.

A second belt conveyer is used, the same including sprocket chains 53 connected by slats 54. The belt conveyer 53—54 coöperates with the sprocket wheels 42 on the shaft 38, the sprocket wheels 43, the sprocket wheels 48, the sprocket wheels 49, the sprocket wheels 50, the sprocket wheels 52 on the shaft 30 and from the sprocket wheels 52, the conveyer extends upwardly around the sprocket wheels 42. The arms 45, the drum 103 and the sprocket wheels 43 constitute a tightener for the belt conveyer 53—54. It is to be observed that those parts of the belt conveyer 53—54 which coöperate with the sprocket wheels 52—49 constitute cake turners, coacting with the first and second bends of the belt conveyer 36—37 above defined. From the sprocket wheels 52, the belt conveyer 53—54 extends below the upper intermediate run of the belt conveyer 36—37, and from the sprocket wheels 50 the belt conveyer 53—54 extends above the lower intermediate run of the belt conveyer 36—37. The construction is such that when the tortillas move in the direction of the arrow A of Fig. 1 along the first conveyer 36—37, the tortillas will be turned by that portion of the conveyer 53—54 which coöperates with the sprocket wheels 52, the tortillas traveling along between spaced parts of the two conveyers, until the sprocket wheels 50 are reached, whereupon the tortillas are turned by mechanism to be described hereinafter. From the sprocket wheels 50, the tortillas, having been inverted, travel between spaced portions of the conveyers until the sprocket wheels 35 are reached, whereupon the tortillas are turned by that portion of the conveyer 53—54 which engages with the sprocket wheels 49, and are deposited by the chute 12 in the receptacle 11, the tortillas being baked or cooked by the action of the heaters 9, as the tortillas are moved along.

A belt 56 has frictional contact with the drum 55 on the shaft 32 and shapes itself to the drum 104 as the tortillas move downwardly across the drum 104. The belt 56 is supported and guided on rollers 57 carried by the arms 7. The belt 56 constitutes a cake turner, driven by the drum 55 and coöperating with the drum 104, and with the bend in the conveyer 53—54, where the same engages the sprocket wheels 50.

The operation of the structure has been dealt with hereinbefore step by step, but by way of résumé, it may be stated that when the shaft 15 is driven by means of the pulley 16 and the belt 18, the pulley 17 drives the belt 19 and the latter, coöperating with the pulley 20, drives the first conveyer 36—37. From the first conveyer, motion is imparted to the second conveyer 53—54 by means of the chain 40, the sprocket wheel 39 on the shaft 38 and the sprocket wheel 41 on the shaft 30. The tortillas are advanced with respect to the heaters 9, and are turned repeatedly, the tortillas ultimately being delivered into the receptacle 11.

Especial attention is directed to the belt 56, which forms a turner, and to the way in which this belt is mounted and operated.

Having thus described the invention, what is claimed is:

1. In a machine for cooking tortillas, a frame; a first endless belt conveyer; means on the frame for disposing the first conveyer to form a top run, an upper intermediate run, a lower intermediate run, a bottom run connected with the top run, and bends connecting certain of the runs; a second endless belt conveyer; means on the frame for disposing the second conveyer parallel to the bends to form cake turners, for disposing the second conveyer parallel to and below the upper intermediate run, for disposing the second conveyer parallel to and above the lower intermediate run, and for fashioning a bend in the second conveyer; a cake turner coöperating with the bend of the second conveyer, and means for heating certain of the runs.

2. A machine for cooking tortillas, constructed as described in claim 1, in combination with a rotary frame-supported member over which the first conveyer passes, between the intermediate runs, the machine being characterized, further, by the fact that the cake turner which coöperates with the bend of the second conveyer is in the form of a belt driven by the rotary member; and frame-carried means for supporting the last specified belt.

3. A machine for cooking tortillas, comprising a frame; rotary members thereon; belt conveyers engaged around the rotary members and located one inside of the other; means for heating the belt conveyers; a belt disposed approximately at right angles to the conveyers, one run of the belt engaging one of the rotary members in driving relation, and the other run of the belt coöperating with the other rotary member to form a cake turner; and frame-carried means for supporting the last specified belt adjacent said other rotary member.

In testimony that I claim the foregoing as my own, I have hereto affixed my signature in the presence of two witnesses.

PABLO GONZALES GARZA.

Witnesses:
José P. Garcia,
L. Frize.

Copies of this patent may be obtained for five cents each, by addressing the "Commissioner of Patents, Washington, D. C."